United States Patent [19]

Touba

[11] 3,767,417
[45] Oct. 23, 1973

[54] METHOD OF ROASTING COFFEE
[75] Inventor: Ali R. Touba, Minneapolis, Minn.
[73] Assignee: General Mills, Inc., Minneapolis, Minn.
[22] Filed: Feb. 16, 1970
[21] Appl. No.: 11,855

[52] U.S. Cl. ............................................. 426/523
[51] Int. Cl. ............................................. A23f 1/02
[58] Field of Search ................................. 99/65, 68

[56] References Cited
UNITED STATES PATENTS
2,282,708   5/1942   Dantzig ................................. 99/68
2,278,473   4/1942   Musher ................................. 99/65
2,281,320   4/1942   Odell, Jr. ............................. 99/68

Primary Examiner—Frank W. Lutter
Assistant Examiner—William L. Mentlik
Attorney—Anthony A. Juettner, Gene O. Enockson and Norman P. Friederichs

[57] ABSTRACT

A method is disclosed in which coffee beans are roasted between a pair of heated surfaces which exert a compressive force on the beans sufficient to reduce the thickness of the beans but less than that necessary to crush the beans. The compressive force, generally, will be from 200 to 1,000 pounds per square inch. The roasting temperature generally will be from 400° to 650° F. and the roasting period generally will be from 2 to 40 seconds. The roasting method may be carried out in an open system at atmospheric pressure or in an enclosed system at an elevated gaseous pressure.

5 Claims, No Drawings

METHOD OF ROASTING COFFEE

BACKGROUND OF THE INVENTION

The present invention relates to food processing and more particularly to a method of roasting coffee beans.

In the past various techniques have been used in roasting coffee beans; however, today most coffee processors still roast the green coffee beans using a batch method. Typically, the green coffee beans are placed in a revolving perforated metal culinder and gases, at temperatures of up to 400° F. are passed through the drum. In some instances the coffee beans, during the roasting cycle, are under a gaseous pressure, for example, of 100 to 350 pounds per square inch gauge. The conventional roasting techniques may require as much as 15 to 20 minutes for a roasting cycle.

The known roasting methods have certain obvious disadvantages. For example, the roasting cycle is slow thus tying up equipment. The hot gases passing through the container of beans over an extended period of time drive off a certain amount of volatile material from the coffee bean which if retained would strengthen the flavor of the coffee brew. The escaping volatile materials have been known in the past to create a fire hazard. Furthermore, the soluble flavoring materials, which remain in the roasted beans, may be adversely affected by the long heating period, such as by oxidation. Large pressure cookers and large air or gas compressers are required if roasting is carried out under an elevated gaseous pressure.

THE PRESENT INVENTION

The method of the present invention overcomes many of the disadvantages of the known roasting methods. The method of the present invention may be carried out using very simple apparatus. The roasting cycle may be very short, for example, about 20 to 25 seconds. The soluble solids content of the roasted coffee beans may be increased as much as 33 percent or more over the soluble solids content of conventionally roasted coffee beans. Roasting coffee beans in accordance with the present invention results in better flavor, taste and aroma in the coffee brew. The strength of the coffee brewed from beans roasted by the present method is increased for any given weight of roasted coffee beans. Stated differently, it was found that one may brew coffees of comparable strengths using about one-third to one-half less of coffee beans roasted according to the present invention than the amount used of conventionally roasted coffee beans. The present invention results in about 50 percent less weight loss during roasting as compared with conventional processes. Moreover, the coffee beans roasted according to the present invention are more uniform in roast and taste.

In the present invention green coffee beans are roasted between a pair of heated surfaces which exert compressive force on the beans. Any desired type of coffee beans may be roasted by the present method. Either a single variety or a blend of coffee beans may be roasted. The coffee beans may be either whole or ground at the time of roasting. The roasting conditions, of course, may vary somewhat depending on the particular variety of coffee beans being roasted, the size of the beans or bean particles, the water content of the bean and the degree of roasting desired. Illustrative roasting conditions that may be used in carrying out the present invention are as follows: The coffee beans may be raised to a temperature of between about 400°and 650° F. over a period of from 2 to 40 seconds. The pressure exerted on the beans by the heated surfaces may be between 200 and 1,000 pounds per square inch.

The temperature used in the present invention should be sufficient to roast the coffee beans to the desired degree within a relatively short time, such as under 1 minute, and yet not so high of a temperature as to result in uneven roasting within individual beans resulting in scorching of the bean surface. The roasting temperature is preferably within the range of 400° to 650° F. and more preferably about 500° F. The term "roasting temperature" is intended to mean the temperature of the heated surfaces.

The amount of heat energy available from the heated surfaces is of importance. The heat surfaces preferably contain sufficient heat energy that the temperature of the surfaces remains substantially constant throughout the roasting cycle. For example, the temperature preferably varies less than 50° F. during the roasting cycle and in any event the temperature should not fall below the temperature at which a satisfactory roast may be obtained. The heated surfaces should be of a material that can rapidly transfer heat energy to the coffee beans. Such a heat energy content and rapid heat transfer can be provided by metal plates having a large mass in comparison to the mass of the coffee beans being roasted.

The duration of the roasting cycle must be short in order to avoid loss of volatile solids from the coffee beans. The roasting period may be in the range of 2 to 40 seconds, preferably 10 to 30 seconds and rarely, if ever, more than 1 minute. Generally the roasting period will be about 20 seconds. The roasting period is the period during which the beans are compressed and heated. Coffee beans were roasted according to the present invention for 40 seconds at 470° F. and a satisfactory brew of coffee was prepared from the roasted beans. Coffee beans were roasted for 19 seconds at 500° F. according to the present invention and coffee brew prepared from these beans had excellent taste and very high soluble solids content. Satisfactory results were also obtained using a very short roasting period, for example, 2 or 3 seconds when the green coffee beans were ground to a particle size of about 0.066 inch and then roasted at a temperature of between 600° and 650° F.

The compressive force exerted by the heated surface on the coffee beans must be sufficient to provide good physical contact and in turn rapid heat transfer between the heated surface and the coffee beans. The compressive force preferably is sufficient to reduce the thickness of the beans somewhat during roasting. The compressive force should not be great enough to crush or shred the beans. The beans are considered to be crushed if they are compressed to such a degree that a substantial amount of oil is expressed, the beans are flattened to such a degree that they fail to regain at least 50 percent of their original thickness and/or a substantial amount of fragmentation takes place. Satisfactory grinding results are not obtained if the beans are crushed, particularly if a coarse grind is desired. Expression of oil results in loss of oil and in turn loss of flavor in the brew. Furthermore, if the oil adheres to the outer surface of the beans, the oil may oxidize and become rancid during storage. In one instance hole Guatemalan beans having a thickness of about 0.145 inch, were preheated for 3 minutes to raise the temperature of the beans to 200° F. The beans then were compressed to a thickness of about 0.031 inch which necessitated using a pressure in excess of 1,000 p.s.i.g. The beans were heated at 400° F. for 2 seconds. The beans were then compressed to about 0.021 inch and heated at 500° F. for 2 seconds. The resulting roasted beans were crushed, oil was expressed and the product was unsatisfactory. On the other hand, a highly satisfactory product was obtained when the same type of bean was compressed to about 0.082 inch during roasting using the conditions of the present invention. Of course, the appropriate thickness of the compressed bean will depend on the thickness of the green coffee bean or bean particle. For example, green coffee beans were ground to a particle size of about 0.066 inch and then compressed to about 0.02 inch during roasting. The resulting product was satisfactory. Regardless of the original size of the green coffee beans or bean particles, the beans are compressed to between 35 and 80 per cent, preferably between 40 and 50 per cent, of the original size during roasting and such beans expand upon release of the pressure, preferably to between 110 and 125 per cent of their original size. The amount of force necessary to provide this degree of compression will vary somewhat depending on the variety of beans, the moisture content of the beans and the temperature of the roast. The compressive force will generally be between 200 and 1,000 pounds per square inch of contact area. In this instance the contact area is defined as the surface area of the beans in contact with the heated surface. The preferred compressive force is about 500 pounds per square inch of contact area.

The apparatus used to carry out the roasting methods described in the following examples was a 12 ton Carver Laboratory Press equipped with a pair of heated platens. The Carver Press was hydraulically driven and capable of exerting a total of at least about 24,000 pounds of force. Each platen was an iron platen approximately 6 inches by 6 inches by 1 inch. The platens were aligned one above the other with the upper platen being vertically moveable and the lower platen being stationary. The platends or plates were electrically heated and had a total power input of about 1,140 watts. The apparatus included a thermostat which controlled the temperature of the plates and a dial gauge for measuring the pressure exerted between the plates. Metal spacers were provided between the plates in order to control the degree to which the beans were compressed during the roasting cycle.

The preferred method uses a closed system in which both mechanical and gaseous pressure are applied to the beans. Examples I–IV are illustrative of a closed roasting system in which the spacer is continuous around the edge of the platens and provides a seal between the platens during the roasting cycle. The spacer in the case of roasting whole beans was made from a metal plate 6 inches by 6 inches by 0.082 inch. The center portion of the plate was removed providing an open area 4½ inches by 4½ inches. The spacer used in roasting the ground coffee beans of Example II was identical except that the thickness was 0.02 inch. The continuous spacer was supported on and aligned with the lower stationary platen. During the roasting cycle the platens were urged toward each other and thus against the spacer with sufficient force to provide a gaseous seal between the plates and the spacer. Vaporization of materials found in the green coffee beans provides the elevated gaseous pressure.

Examples III and IV illustrate coffee beans roasted in an open system in which gases created during roasting are allowed to escape from between the heated plates. The spacers in the open roasting system were four small washers supported on the lower plate, one such washer being located near each of the four corners of the stationary platen.

The following examples are illustrative of the present invention and are not intended to be limiting. Of course, various other types of equipment may be used in carrying out the present invention. For example, one or both of the platens may be replaced with continuous belts so long as the necessary heat capacity is provided. Also spacers need not be provided between the platens providing other means are present to prevent crushing of the beans, for example, means for controlling the amount of pressure applied to the beans.

EXAMPLE I

Guatemalan coffee beans were roasted according to the present invention using the closed system. The continuous spacer was placed on a sheet of aluminum foil. Thirty grams of whole green Guatemalan coffee beans were placed in the open center of the spacer. The beans were in a layer one bean in thickness. The aluminum foil was then folded around the spacer and the beans to prevent loss of the beans during transportation to the Carver Press. The platens, with the beans and spacer therebetween, were urged toward one another for 19 seconds at a pressure of 20,000 pounds. The platens were at a temperature of about 500° F. The beans were compressed to the thickness of the spacer, namely, 0.082 inch during roasting and the balance of the force was absorbed by the spacer. The mechanical force exerted on the coffee beans was about 500 pounds per square inch. When the pressure was released, the roasted beans expanded to about 125 percent of the original thickness. The beans were removed from the press and immediately cooled. The roasted coffee beans were ground to a particle size in the range known conventionally as "regular grind" coffee. A highly satisfactory brew was prepared from such ground coffee beans. For purposes of comparison a brew was prepared from commercially available, conventionally roasted, ground Guatemalan beans. The brews were identically prepared except that in preparing the brew from coffee beans roasted according to the present invention 46 percent less ground coffee was used. A panel found that the brews were of comparable strengths.

EXAMPLE II

Thirty grams of Guatemalan beans were roasted as described in Example I except that the beans were first ground to a particle size of about 0.066 U.S. Sieve. The continuous spacer was 0.02 inch in thickness. The ground beans were roasted at 650° F. for about 2 seconds. The pressure exerted by the Carver Press was about 20,000 pounds. A brew prepared from the roasted, ground coffee beans was found to have satisfactory color, body, aroma, and taste.

EXAMPLE III

Whole Guatemalan beans were roasted according to the present invention. Sample III-A was roasted using the closed system. The spacer had a thickness of 0.082 inch. The pressure actually exerted on the beans during roasting was about 500 pounds per square inch of bean surface. The beans were roasted for 19 seconds at which time the temperature in the center of the beans was 500° F. The total pressure exerted by the platens was 20,000 pounds. Sample III-B was roasted using the open system. The spacers were washers 1.25 inches in diameter and three-thirtyseconds inch in thickness. The remaining roasting conditions of Sample III-B were identical to those described with respect to Sample III-A. Sample III-A, III-b and conventionally roasted coffee beans were found to contain the following amounts of water soluble solids: Sample III-A was 32.5 per cent; Sample III-B was 26.3 per cent; and conventionally roasted coffee was 20.4 per cent, by weight.

EXAMPLE IV

A blend of coffee beans was roasted under the conditions described in Example III. The blend included equal amounts by weight of Indian, Guatemalan, Honduran, Mexican, Costa Rican, Ecuadorian, high quality Indonesian and low qaulity Indonesian coffee beans. Sample IV-A, which was roasted by the closed system at a compressed thickness of about 0.82 inch and had a soluble solids content of 36.6 per cent. Sample IV-B, which was roasted by the open system at a compressed thickness of about 0.82 inch and had a soluble solids content of 29.2 per cent and a conventional roast of the same blend had a soluble solids content of 21.25 per cent.

I claim:

1. A method for roasting coffee beans comprising: compressing and heating green coffee beans between a pair of opposing heated surfaces, a continuous spacer being disposed between said pair of opposing heated surfaces, said heated surfaces exerting sufficient force on said spacer to provide a seal therebetween, said surfaces exerting sufficient force on said beans to reduce the thickness of the beans and provide heat transmitting physical contact between the heated surfaces and the beans, said force being less than the amount necessary to crush the beans, the temperature and heat content of said pair of surfaces being sufficient to roast the beans in less than one minute, wherein the beans are roasted in a closed zone defined by said heated surfaces and said continuous spacer, and wherein the beans are roasted at an elevated gaseous pressure provided by vaporization of coffee bean material within the closed zone.

2. The method of claim 1 wherein the coffee beans are compressed to between 35 and 80 per cent of their original thickness during roasting.

3. The method of claim 2 wherein the coffee beans are heated to a temperature of between 400° and 650° F. over a period of from 2 to 40 seconds.

4. A method for roasting coffee beans comprising: compressing and heating green coffee beans between a pair of opposing heated surfaces, said surfaces exerting sufficient force on said beans to reduce the thickness of the beans and provide heat transmitting physical contact between the heated surfaces and the beans, said force being less than the amount necessary to crush the beans, the temperature and heat content of said pair of surfaces being sufficient to roast the beans in less than one minute, the beans being roasted at an elevated gaseous pressure, said elevated gaseous pressure being provided by vaporization of coffee bean material and the beans being expanded upon release of the compressive force.

5. A method for roasting coffee beans comprising: compressing and heating green coffee beans between a pair of heated surfaces, said surfaces exerting a force of from 200 to 1,000 pounds per square inch on said beans, the temperature of said surfaces being in the range of from 400° to 650° F. the coffee beans being roasted in a closed system at a gaseous pressure greater than atmospheric pressure, said gaseous pressure being provided by vaporization of coffee bean material.

* * * * *